_United States Patent Office_

3,705,887
Patented Dec. 12, 1972

3,705,887
CYCLIC DECAPEPTIDES AND METHODS OF SYNTHESIZING THE SAME
Theodor Wieland, Mainz (Rhine), Wilhelm Konz, Ingelheim (Rhine), and Jurgen Faesel and Jurgen Lewalter, Frankfurt am Main, Germany, assignors to Boehringer Ingelheim G.m.b.H., Ingelheim (Rhine), Germany
No Drawing. Filed Oct. 9, 1968, Ser. No. 766,312
Int. Cl. C07c *103/52;* C07g *7/00*
U.S. Cl. 260—112.5          1 Claim

ABSTRACT OF THE DISCLOSURE

The compounds are derivatives of antamanide, and their synthesis involves the cyclization of the corresponding acyclic decapeptide.

BACKGROUND OF THE INVENTION

The isolation and identification of the component substances of the poisonous green fungus *Amanita phalloides* has been described several times in the literature; cf. Liebig's Ann. Chem., volume 617, page 152 (1958), and volume 704, page 226 (1967).

The previously published articles disclose that the poisonous green fungus *Amanita phalloides* contains at least ten peptide-like substances of complex structure, namely the representatives of the phalloidine group and those of the amanitine group. Most of these substances have proved to be extremely toxic liver toxins [cf. Pharmacol. Reviews, volume 11, page 87 (1959)].

After isolation of the individual components, it was surprisingly found that one of these substances called antamanide, is not only completely non-toxic itself when administered in therapeutic doses, but is, moreover, capable of annulling the toxic effect of an absolutely fatal dose of phalloidine or of protecting the liver completely from such a dose.

In the course of further investigations we have found that this prophylactic activity persists or is even intensified when the antamanide molecule is slightly modified pursuant to the present invention.

The subject of the instant invention, therefore, is a process for the synthesis of a cyclic decapeptide of formula

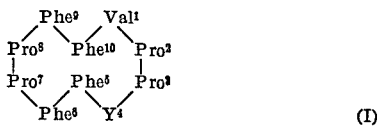

(I)

wherein Y represents the group L-alanyl, D-alanyl or glycyl, by cyclization of a corresponding acyclic decapeptide.

The cyclization is performed according to conventional methods in peptide synthesis and may take place at any desired place in an acyclic precursor of the cyclic decapeptide between an amino group and a carboxyl group. In the case of the aminoacid proline, the imino group (HN=) may be present at the end of the chain instead of an amino group (H₂N—).

Two processes are mainly involved, both of which, however, are suitable for general application.

In the first process, one end of the chain, preferably the carboxyl group, is applied in an activated form, while the amino group has already been reversibly protected by the previous synthesis, or, if this is not the case, must be protected. The amino protective group is then selectively split off in such a way that the amino group thus liberated is protected simultaneously by protonation. Deprotonation of the amino group by bases in highly dilute solution leads to cyclization.

According to a second process, one starts with a peptide zwitter ion, the amino group of which is already present in protonated condition. By activation of the carboxyl group and addition of a base in diluted solution, or by addition of a dehydrating agent to the peptide zwitter ion the cyclic end product is also obtained in one step.

All of the cyclization methods are performed in relatively great dilutions in order to suppress di- and polycondensations.

A variation, in which the danger of polymerization is avoided, consists of suitably protecting the nitrogen of the peptide to be cyclized, activating the latter with its carboxyl group by contact with a synthetic resin, splitting off the protective amino group, and effecting the cyclization by adding a base. By adsorption of each individual molecule on the resin a reciprocal reaction is made impossible.

The following have proved to be well suited as carboxyl-activating groups for the first-mentioned process: Lower esters, azides, p-nitrophenyl, thiophenyl, o-cyanomethyl or p-methylsulphonylphenyl. The activation by imidazolide formation (cf. L. A. Albertson, Organic Reactions, volume 12, pages 157–355 (1962)) should also be mentioned.

Certain activation reagents possess the property of removing a proton from $-NH_3^+$ during the activation process at the carboxyl group. Synchronous with the activation, the amino group is thereby liberated which reacts with the activated carboxyl group leading to cyclization. Examples of these reagents are carbodiimides, such as dicyclohexylcarbodiimide, alkoxyacetylenes, di-(2,4-dinitrophenyl)carbonate, other carbonic acid esters, as well as dialkylpyrophosphites. They are preferably used for reactions according to the second process indicated.

Suitable amino-protective groups are those which may be selectively split off without affecting the activated carboxyl group; for example, tert.-butyloxycarbonyl, benzyloxycarbonyl, p-nitrobenzyloxycarbonyl, trityl, phthaloyl, formyl, trifluoroacetyl, tosyl, cyclo-pentyloxycarbonyl or phenoxycarbonyl radicals.

Organic bases, such as triethylamine, pyridine, N-methylmorpholine, dimethylaniline, N-ethylpiperidine, etc., are preferably used for the cyclizing reaction with bases.

For the synthesis of the novel cyclic decapeptides according to the present invention an improved process for the one-step cyclization was applied for the first time, by means of which the yields could be considerably increased, as follows:

The hydroxyl group of the acyclic decapeptide, dissolved in a suitable solvent, was activated by reaction with a haloformate in the form of mixed anhydride, the free amino group being simultaneously protonated. It turned out that the protonation caused by the haloformate at the nitrogen atom of the peptide zwitter ion did not suffice to avoid an attack of the haloformate upon the nitrogen atom. This insufficiency is overcome by addition of an acid which provides for ample protonation of the nitrogen, but does not protonate and thus deactivate the anion. Such an acid must necessarily possess a pK-value lying between that of the ammonium group (pK=9.5) and that of the carboxylate group (pK=3.5). For this purpose pyridine hydrochloride has proved to be particularly suitable, which is preferably added in excess to the reaction solution. In several cases these measures succeeded in increasing the yield 3- to 4-fold.

The production of the starting materials, i.e. of acyclic decapeptides which may be cyclized to the decapeptides according to the invention, may be effected pursuant to all conventional methods of peptide synthesis. In the following diagram for the production of the acyclic decapeptides is indicated.

(1) Phe-Pro-Pro-Phe-Phe-Val-Pro-Pro-Ala-Phe and
(2) Phe-Phe-Pro-Pro-Phe-Phe-Val-Pro-Pro-Gly All aminoacids belong to the L-series.

1.

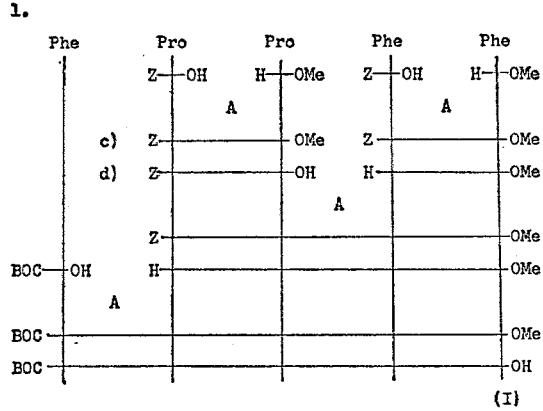

(I)

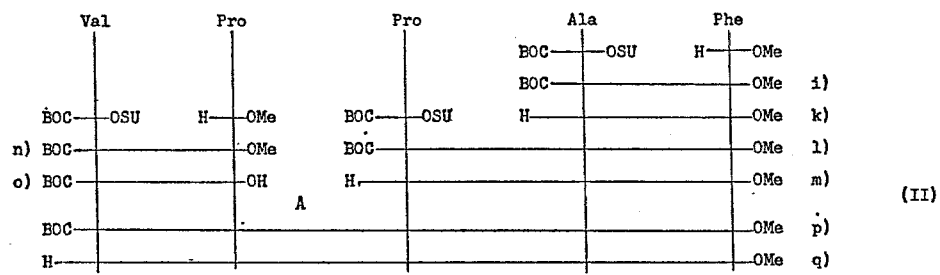

(II)

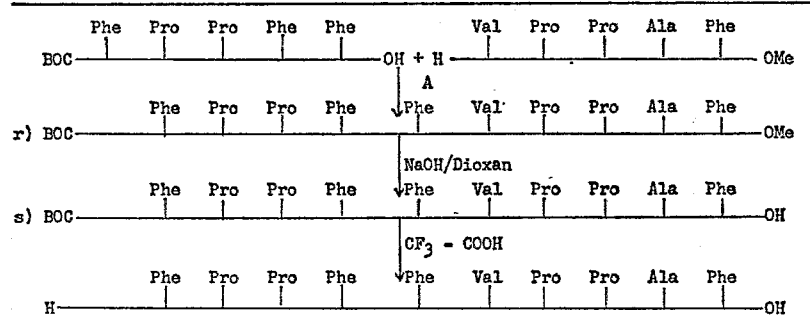

(III)

2.

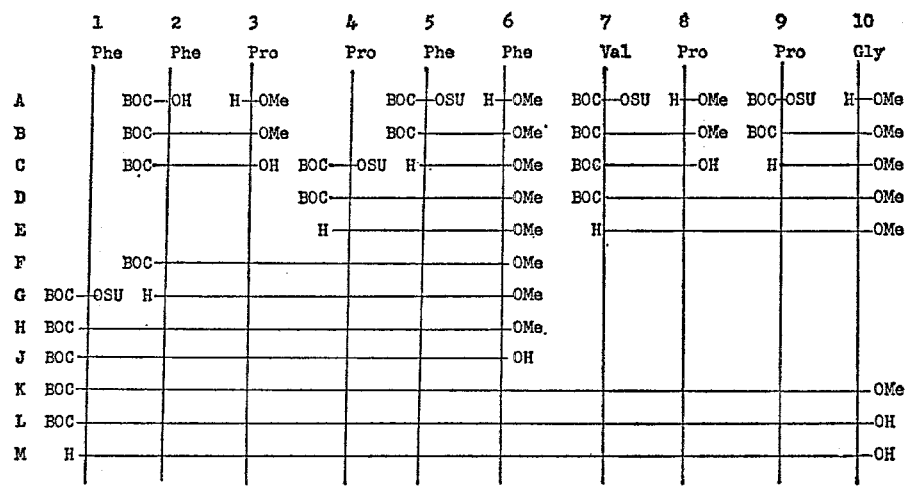

The symbols used in these diagrams have the following meanings:

BOC: tert. butyloxycarbonyl
Me: methyl
Z: benzyloxycarbonyl
A: linkage via a mixed anhydride
OSU: hydroxysuccinimideester The following examples further illustrate the present invention will enable others skilled in the art to understand it more completely. It should be understood, however, that the invention is not limited solely to the particular examples given below.

EXAMPLE 1

Antamanide (one-step-cyclization)

116 mgm. of L-phenylalanyl-L-prolyl-L-prolyl-L-phenylalanyl - L - phenylalanyl - L-valyl-L-prolyl-L-prolyl-L-alanyl-L-phenylalanine (t) were dissolved with 115 mgm. of pyridinehydrochloride in 20 ml. of absolute dimethylformamide, and after addition of 80 ml. of absolute tetrahydrofuran cooled to −15° C. on a cold bath. While stirring, 5 ml. of a solution of 0.95 ml. of ethyl chloroformate in 99.05 ml. of absolute tetrahydrofuran were added to the cold solution, and the solution was allowed to stand for 20 minutes at −15° C. Then, 0.17 ml. of N-methylmorpholine were added, and the mixture was stirred for 6 hours more at room temperature. After evaporation of the solvent in vacuo, the residue was dissolved in a little methanol, and the solution was applied as starting line to two preparative thin-layer plates of silicagel PF (0.3 mm.). After development with sec. butanol-ethylacetate-water (14:12:5) the cyclopeptide zones were eluated at $R_F \sim 0.65$ with methanol. After evaporation of the solvent, the residue was taken up in several ml. of a mixture of methanol and water (10:1) and chromatographed on a column (40 x 1800 mm.) of Sephadex LH–20 with the same mixture. The compound appearing in the eluate after approx. 1 liter was antamanide. It crystallized when triturated with butanone. Yield: 27 mgm. (24% of theory) M.P. 171.5–172° C. (sintering from 167.5° C.). The $R_F$-value obtained by thin-layer chromatography in isopropanol-benzene-water (4:3:1) was identical with that of natural antamanide (0.81).

EXAMPLE 2

Antamanide (multi-steps cyclization)

A solution of 510 mgm. of tert. butyloxycarbonyl-L-phenylalanyl - L - prolyl - L - prolyl - L - phenylalanyl-L-phenylalanyl - L - valyl - L - prolyl - L - prolyl - L - alanyl-L-phenylalanine (s) in 10 ml. of absolute tetrahydrofuran was admixed at —15° C. first with 0.045 ml. of N-methylmorpholine and then with 0.03 ml. of ethyl chloroformate. Then 0.06 ml. of thiophenol was added, and the mixture was allowed to stand for 2 hours at room temperature. After the solvent had been evaporated in vacuo, the residue was taken up in ethyl acetate, the solution was extracted three times with a 5% KHCO$_3$-solution, and the extract solution was washed neutral with a little water and dried over MgSO$_4$. After evaporation of the ethylacetate (315 mgm., 58%) 3 ml. of anhydrous trifluoroacetic acid, were poured over the residue, whereby it dissolved. After 1.5 hours of standing the acid was evaporated in vacuo, the residue, the trifluoroacetate of the decapeptide-thiophenylester, was dissolved in 3 ml. of methanol-water (10:1) and chromatographed in a Sephadex LH–20-column with the same mixture of solvents. 141 mgm. (45%) of pure trifluoroacetate were obtained.

135 mgm. of the trifluoroacetate of the decapeptide-thiophenylester were dissolved in 10 ml. of dimethylformamide, and the solution was added dropwise slowly to 150 ml. of pyridine, which was kept at a temperature of 60° C. in a thermostat. At this temperature the mixture was allowed to stand for 20 hours; thereafter, the pyridine was evaporated in vacuo and the residue was chromatographed in a Sephadex LH–20 column (25 x 100 cm.) with methanol. The substance appearing in the eluate from 220 ml. to 300 ml. is antamanide. Yield: 57 mgm. (40%), M.P. 171.5–172° C. (sintering from 167.5° C.). The starting materials (s) and (t) were produced according to the following process:

PENTAPEPTIDE DERIVATIVE I (a) Benzyloxycarbonyl (=Z) L-phenylalanyl-L-phenylalaninemethylester.—100 gm. of Z-L-phenylalanine were dissolved in 600 ml. of tetrahydrofuran with the aid of 46.5 ml. of triethylamine, while stirring. At —15° C. (ice-salt bath) the solution was admixed dropwise with 31.1 ml. of ethyl chlorocarbonate at a rate such that the internal temperature did not rise above —4° C. Stirring was continued for 6 minutes at —4° C., and then a solution of L-phenylalanine-methyl ester, prepared from 72 gm. of the ester hydrochloride in 100 ml. of tetrahydrofuran, cautious addition of water until dissolution and addition of 46.5 ml. of triethylamine, was added in small portions over a period of one minute. Stirring was continued without cooling until room temperature was reached, and the solvent was evaporated in vacuo until only a little water was left. The residue was taken up in 5 times its volume of ethylacetate, the solution was washed three times with 100 ml. of 1 N HCl, three times with an equal volume of water and three times with an equal volume of a 5% KHCO$_3$ solution. After extraction with a little water, the solution was dried over anhydrous MgSO$_4$, filtered and the solvent was evaporated in vacuo. The residue was reprecipitated from ethylacetate/petroleumether. 108 gm. (70%) crystals, M.P. 146–167° C., were obtained.

(b) L - phenylalanyl - L - phenylalaninemethyl-ester-hydrochloride.—76 gm. of the Z-peptide-ester obtained according to (a) were hydrogenated in a mixture of 30 ml. of 9.9 N methanolic hydrochloric acid, 450 ml. of absolute methanol and 250 ml. of absolute dioxane over approximately 10 gm. of black palladium catalyst at 40–45° C. in a hydrogen current under vibration, until the waste gas did not contain any more CO$_2$. After filtration the reaction solution was evaporated in vacuo. 58 gm. (57% of theory) of the dipeptide ester-hydrochloride remained as a colorless powder.

(c) Z-L-prolyl-L-prolinemethylester.—This ester was obtained from 91 gm. of Z-L-proline and 57 gm. of L-prolinemethyl ester by means of the mixed anhydride method, as described under (a). Yield: 41 gm. (34%), M.P. 78–79° C.

(d) Z-L-prolyl-L-proline.—130 gm. of the ester obtained according to (c) above were dissolved in 270 ml. of very pure dioxane and the solution was admixed with 400 ml. of 1 N sodium hydroxide. While dropping in water, the solution was vibrated until the volume had tripled (approx. 1 hour). The dioxane and part of the water were evaporated in vacuo, and the aqueous solution of the sodium salt was extracted twice with a little ethylacetate. Then the Z-L-prolyl-L-proline was liberated with 1 N hydrochloric acid, taken up by shaking several times in a total of 300 ml. of ethylacetate and, after drying of the solution over MgSO$_4$, isolated by evaporation. Yield: 114 gm. (91%), M.P. 186–188° C.

(e) Z-L-prolyl-L-prolyl L-phenylalanyl-L-phenylalanine methyl ester.—This ester was prepared from the mixed anhydride of 52 gm. of Z-L-prolyl-L-proline (d) in 660 ml. of tetrahydrofuran-dimethylformamide (10:1) 21 ml. of triethylamine and 14.25 ml. of ethyl chloroformate, according to the process described under (a) with 54.4 gm. of dipeptideesterhydrochloride (b) under addition of 23 ml. of triethylamine in 100 ml. of tetrahydrofuran. Yield: 80 gm. (82%), of white crystals (from ethylacetate) M.P. 140–141° C.

(f) L - prolyl-L-prolyl-L-phenylalanyl-L-phenylalanine methyl ester was obtained by catalytic hydrogenation of 10 gm. of Z-tetrapeptide ester (e) over 1.5 gm. of palladized charcoal in 150 ml. of absolute methanol. After recrystallization from methanol 6.4 gm. (81%) of white needles, M.P. 148–150° C., remained.

(g) Tert. butyloxycarbonyl-(=BOC)-L-phenylalanyl-L-prolyl-L-prolyl-L-phenylalanyl-L-phenylalanine methyl ester was obtained from 5.3 gm. of BOC-L-phenylalanine via the mixed carbonic acid anhydride prepared corresponding to (a) and 5.2 gm. of the tetrapeptide ester described under (f). After reprecipitation from ethylacetate, 6.2 gm. (80%) of white crystals, M.P. 77–79° C., were obtained.

(h) BOC - L-phenylalanyl-L-prolyl-L-prolyl-L-phenylalanyl-L-phenylalanine (pentapeptide derivative I) was prepared by alkaline hydrolysis (as in (d)) from 3.0 gm. of the BOC-pentapeptide ester (g), using a 5% citric acid solution. Yield: 2.7 gm. (88.5%) of BOC-L-phenylalanyl-L-prolyl-L-prolyl-L-phenylalanyl - L - phenylalanine (amorphous white product of uniform behavior during thin-layer chromatography).

PENTAPEPTIDE DERIVATIVE II (i) BOC-L-analyl-L-phenylalanine methyl ester.—21.6 gm. of L-phenylalanine methyl ester hydrochloride were dissolved in 60 ml. of dimethylformamide, and a solution of 10.2 gm. of triethylamine in 150 ml. of absolute tetrahydrofuran was added thereto. The mixed solution, turbid due to precipitated triethylamine salt, was added to a solution of 28.2 gm. of BOC-L-alanine hydroxysuccinimide ester [prepared according to G. W. Anderson, J. E. Zimmermann and F. M. Callahan, J.A.C.S. 86, 1839 (1964)] in 150 ml. of absolute tetrahydrofuran, while stirring. After 15 hours of standing, the triethylamine hydrochloride was vacuum filtered off, and the filtrate was evaporated in vacuo. After dissolution of the residue in ethyl acetate, extracting the solution several times with water, then with saturated sodium bicarbonate solution and again with water, drying over MgSO$_4$, and evaporation in vacuo 31.5 gm. of BOC-L-alanyl-L-phenylalanine methyl ester (90%), M.P. 81–83° C., were obtained.

(k) L-alanyl-L-phenylalanine methyl ester.—30.8 gm. of the BOC-dipeptideester obtained as described under (i) were dissolved in 790 ml. of glacial acetic acid which was 1 N in HCl. After 1.5 to 2 hours of standing the solution was distilled in vacuo, and the residue was admixed thoroughly with absolute ether until everything crystallized. 24.2 gm. (96%) of the crystalline dipeptide-ester hydrochloride, M.P. 150–152° C., were obtained.

(l) BOC - L - prolyl-L-alanyl-L-phenylalanine methyl ester.—10.5 gm. of dipeptide hydrochloride obtained as described under (k) were dissolved in 35 ml. of dimethylformamide while adding a solution of 3.6 gm. of triethylamine in 100 ml. of absolute tetrahydrofuran. The resulting solution was added, as described under (i), to a solution of 11.45 gm. of BOC-L-proline hydroxysuccinimide ester in 50 ml. of absolute tetrahydrofuran and, after 15–20 hours of standing, the solution was worked up as indicated under (i). 14.75 gm. (90%) of the BOC-tripeptide ester, M.P. 119–122° C., were obtained.

(m) L-prolyl-L-alanyl-L-phenylalanine methyl ester.—14.3 gm. of the BOC-tripeptide ester obtained as described under (l) were liberated with glacial acetic acid-HCl from the BOC-group, as described under (k). 11.6 gm. of the colorless amorphous hydrochloride of the indicated tripeptide ester were obtained. Yield: 94%, M.P. 67–78° C.

(n) BOC-L-valyl-L-proline methyl ester.—A solution of 2.6 gm. of L-prolinemethylester in 20 ml. of absolute tetrahydrofuran was added to a solution of 6.3 gm. of BOC-L-valine hydroxysuccinimide ester in 40 ml. of absolute tetrahydrofuran. After 20 hours of standing the reaction solution was worked up as described under (i). 5.7 gm. (87%) of BOC-L-valyl-L-proline methyl ester were obtained (colorless amorphous product).

(o) BOC-L-valyl-L-proline.—24 gm. of BOC-L-valyl-L-proline methyl ester were dissolved in 115 ml. of dioxane. While stirring, 73 ml. of 1 N sodium hydroxide were added to the solution, and stirring was continued for 25 minutes at room temperature. Then, the solution was diluted with 200 ml. of ether, the ethereal phase was separated, the aqueous phase extracted three times with ether, cooled to 0° C., covered with a layer of 100 cc. of ether, and at 0° C. admixed dropwise with the equivalent quantity of concentrated hydrochloric acid. The ether was separated, the aqueous phase was extracted five times with ether, and the combined ethereal solutions were dried over MgSO$_4$. After evaporation of the ether, the residue crystallized with petroleum ether to yield 16.5 gm. (72%) of BOC-L-valyl-L-proline, M.P. 141–144° C.

(p) BOC-L-valyl-L-prolyl-L-prolyl-L-alanyl-L-phenylalanine methyl ester.—According to the mixed anhydride method, as described under (a), 12.6 gm. of the BOC-dipeptide obtained in (o) were coupled with 7.7 gm. of tripeptide methyl ester hydrochloride, as described under (m), to form the pentapapeptide derivative, and the reaction mixture was worked up as described under (a). 9.85 gm. (77%) of BOC-L-valyl-L-prolyl-L-prolyl-L-alanyl-L-phenylalanine methyl ester (colorless foamy product), M.P. 54–57° C., were obtained. A slight impurity, determinable by thin-layer chromatography, may be separated by gel-filtration on Sephadex LH–20 in methanol-water (10:1).

(q) L - Valyl - L-propyl-L-prolyl-L-alanyl-L-phenylalanine methyl ester (peptide derivative II).—4.1 gm. of the BOC-derivative obtained in (p) were covered with 5 to 10 times its amount of anhydrous trifluoro acetic acid, and the mixture was shaken until complete dissolution (development of gas). After 2 hours of standing the trifluoro acetic acid was evaporated in vacuo as far as possible. Absolute ether was poured over the residue, and the ether was evaporated once more, leaving the peptide derivative II as the trifluoroacetate. In order to purify the latter, it was allowed to flow in methanol-water (10:1) through a column (40 x 1800 mm.) of Sephadex LH–20 and, after evaporation of the UV-absorbing main fraction, 4.0 hm. (96%) of the trifluoroacetate of the peptide derivative II were obtained.

DECAPEPTIDE III (r) BOC-decapeptide methyl ester.—1.51 gm. of the peptide derivative I (h) were converted in 15 ml. of absolute tetrahydrofuran with the calculated quantity of ethyl chloroformate and N-methylmorpholine analogous to the methods described under (a) into the mixed anhydride. The resulting solution was reacted with a solution of 1.32 gm. of peptide derivative II (q) in 10 ml. of absolute tetrahydrofuran in the presence of 0.23 ml. of N-methylmorpholine to form the corresponding peptide. After evaporation and processing as above (e.g. under (g), the product was purified with methanol-water (10:1) in a Sephadex LH–20 column by chromatography. 1.6 gm. (63%) of BOC-decapeptide methyl ester were isolated (colorless, thin-layer-chromatographically uniform powder).

(s) BOC - L - phenylalanyl-L-prolyl-L-prolyl-L-phenylalanyl - L - phenylalanyl-L-valyl-L-prolyl-L-prolyl-L-ananyl-L-phenylalanine.—4.5 gm. of the BOC-decapeptide methyl ester described under (r) were dissolved in 60 ml. of dimehtylformamide, and the solution was allowed to stand with ten times the equivalent quantity of 1 N aqueous sodium hydroxide for 1 hour at room temperature. Then, the dimethylformamide was evaporated in vacuo with much water, the BOC-decapeptide acid was liberated by acidification with an aqueous 5% citric acid solution and taken up in ethylacetate. After drying of the solution over MgSO$_4$, 4.21 gm. (95%) of the colorless, amorphous, thin-layer-chromatographically uniform powder were isolated.

(t) L - phenylalanyl - L-prolyl-L-prolyl-L-phenylalanyl-L - phenylalanyl - L - valyl-L-prolyl-L-prolyl-L-alanyl-L-phenylalanine (III).—4.21 gm. of the BOC-decapeptide (s) were freed of the BOC group with 25 ml. of trifluoroacetic acid, as described under (q). The white trifluoroacetate remaining after evaporation in vacuo was dissolved in several ml. of methanol-water (10:1) in order to remove the trifluoroacetic acid, and the solution was admixed with 1.6 gm. of ammonium carbonate and chromatographed in a Sephadex LH–20 column with a 0.2% solution of ammonium bicarbonate in methanol-water (10:1) as the solvent system. 3.5 gm. (82%) of the amorphous, thin-layer chromatographically uniform decapeptide were obtained.

EXAMPLE 3

Gly-antamanide (one-step cyclization)

116.6 mgm. (1 millimol) of L-phenylalanyl-L-phenylalanyl - L-prolyl-L-prolyl-L-phenylalanyl-L-phenylalanyl-L-valyl-L-prolyl-L-prolyl-glycine were dissolved with 115 mg. of pyridine hydrochloride in 20 ml. of absolute dimethylformamide. After addition of 80 ml. of absolute tetrahydrofuran the solution was cooled to −15° C. in an ice-salt bath. While stirring, 5 ml. of a solution of 0.95 ml. of ethyl chloroformate in 99.05 ml. of absolute tetrahydrofuran were added, and the mixture was allowed to stand for 20 minutes at −15° C. Then 0.17 ml. of N-methylmorpholine were added, and stirring of the mixture was continued for 6 hours at room temperature. After evaporation of the solvent in vacuo the residue was dissolved in a little methanol, and the solution was applied to two preparative thin-layer plates of silicagel PF (0.3 mm.) as a starting line. After development with sec. butanol-ethyl acetate-water (14:12:5), the cyclopeptide zones were eluated with methanol at $R_F \sim 0.65$. After evaporation of the solvent the residue was taken up in several ml. of methanol-water (10:1) and chromatographed in a column (40 x 1800 mm.) of Sephadex LH-20 with the same mixture. The compound appearing after approximately 1 liter in the eluate was gly-antamanide. It crystallized when triturated with butanone. Yields: 25 mg. (22.2% of theory). The empirical formula

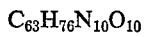

was confirmed in the mass spectrum by the mass peak $m/e$ 1132.

The decapeptide used as starting compound was obtained as follows:

(1) Tert. butoxycarbonyl (=BOC)-L-prolyl - glycine-methylester (B 9/10).—8.0 gm. of tertiary butoxycarbonyl-L-proline (37.3 millimols) were dissolved in 40 ml. of absolute tetrahydrofuran, the solution was cooled to −15° C., admixed with 3.76 gm. of N-methylmorpholine (37.2 millimols) and then 2.02 gm. of ethyl chloroformate (18.65 millimols) were added dropwise to the mixture. The reaction mixture was stirred for 15 minutes at −15° C., whereby N-methylmorpholine hydrochloride separated out. 1.66 gm. (18.65 millimols) of glycine methyl ester were dissolved in 30 ml. of absolute tetrahydrofuran and the solution was added to the above reaction mixture at −15° C. After addition of the glycine methyl ester the mixture was stirred overnight at room temperature. The N-methylmorpholine-HCl which precipitated out was vacuum filtered off, and the filtrate was evaporated in vacuo at 40° C. bath temperature. The evaporation residue was admixed with a suspension of 3.2 gm. of NaHCO₃ in 20 ml. of water, whereby the residue dissolved almost completely. The solution was saturated with NaCl and extracted 5 times with 40 ml. of ether. After drying of the combined ethereal solutions over MgSO₄ the ether was evaporated, and the oily residue was treated with low-boiling-point petroleum ether until crystallization took place. The crystals were vacuum filtered off and recrystallized from ether-petroleum ether. M.P. 68–70° C. Yield: 3.2 gm. (59.8% of theory).

(2) L-prolyl-glycine-methylester-hydrochloride (C/9–10).—9.5 gm. of tert. butoxycarbonyl-L-prolyl-glycine methyl ester (33.2 millimols) were dissolved in 265 ml. of 1 N glacial acetic acid-HCl (265 millimols) at room temperature, and the solution was stirred for 1½ hours. At a bath temperature of 40° C. the glacial acetic acid was distilled off, and the oily residue was treated several times with absolute ether. The ether-insoluble syrup was precipitated from methanol with ether. The methanol/ether solution forming the upper layer was decanted and the highly viscous oil was dried in vacuo. Yield: 7.25 gm. (98% of theory).

(3) BOC-L-valyl-L-prolyl-L-prolyl-glycine-methylester (D/7–10).—19.0 gm. of tert. butoxycarbonyl-L-valyl-L-proline (60.6 millimols) were dissolved in 80 ml. of absolute tetrahydrofuran, the solution was cooled to −15° C., admixed with 6.12 gm. of N-methylmorpholine (60.6 millimols), and subsequently 3.29 gm. of ethyl chloroformate (30.3 millimols) were added dropwise. The reaction mixture was stirred at −15° C. for 10 to 15 minutes, whereby N-methylmorpholine hydrochloride separated out.

6.74 gm. of L-prolyl-glycine methyl ester hydrochloride (30.3 millimols) were dissolved in 15 ml. of dimethylformamide, the solution was admixed with a solution of 3.06 gm. (30.3 millimols) of N-methyl-morpholine in 50 ml. of tetrahydrofuran, and the mixed solution was added to above reaction solution at −15° C. After addition of L-prolyl-glycine methyl ester the mixture was stirred overnight at room temperature. The N-methylmorpholine hydrochloride which separated out was vacuum filtered off, and the filtrate was evaporated in vacuo at 40° C. bath temperature. The evaporation residue was admixed with a suspension of 5.1 gm. NaHCO₃ in 25 ml. of water, whereby the residue dissolved almost completely. The solution was saturated with NaCl and extracted 10 times with 30 ml. of ethylacetate. The ethyl acetate solution was washed five times with 1 N HCl saturated with NaCl, five times with a saturated NaHCO₃ solution, and 3 times with a saturated NaCl solution, dried over MgSO₄ and evaporated in vacuo at 40° C. Yield: 6.0 gm. (41.2% of theory).

(4) L-valyl-L-prolyl-L-prolyl-glycine-methyl ester-hydrochloride (E/7-10).—5.6 gm. of tert. butoxycarbonyl-L-valyl-L-prolyl-L-prolyl-glycine methyl ester (11.62 millimols) were dissolved in 93 ml. (93 millimols) of 1 N glacial acetic acid-HCl at room temperature, and the solution was stirred for 1½ hours. The glacial acetic acid was distilled off in vacuo at a bath temperature of 40° C., and the residual yellow syrup was treated with absolute ether. The powdery precipitate formed thereby was vacuum filtered off, washed with ether and dried. Yield: 4.25 gm. (87.4% of theory), M.P. 90° C. (decomposition).

(5) BOC-L-phenylalanyl-L-phenylalanine-methyl ester (B/5–6).—17.7 gm. of L-phenylalanine methyl ester hydrochloride (82.3 millimols) were dissolved in 45 ml. of dimethylformamide, and the solution was admixed with a solution of 8.1 gm. of triethylamine in 105 ml. of absolute tetrahydrofuran, whereby triethylamine hydrochloride separated out. The resulting suspension was added, while stirring vigorously, to a solution of 27.15 gm. of tert.-butoxycarbonyl-phenyl-alanine-hydroxysuccinimide ester (7.8 millimoles) in 150 ml. of absolute tetrahydrofuran. The reaction mixture was stirred at room temperature overnight. The triethylamine hydrochloride was vacuum filtered off, and the filtrate was evaporated in vacuo at a bath temperature of 40° C. The evaporation residue was dissolved in approximately 400 ml. of ethylacetate, the solution was extracted twice with 50 ml. of water, five times with 30 ml. of 1 N hydrochloric acid, five times with 30 ml. of a 2 N soda solution and three times with 50 ml. of water, dried over MgSO₄ and evaporated in vacuo at 40° C. bath temperature. The yield was 31.3 gm. (98% of theory), M.P. 132–134° C.

(6) L-phenylalanyl-L-phenylalanine methyl ester hydrochloride (C/5–6).—19.0 gm. of tert. - butoxycarbonyl phenylalanyl-phenylalanine methyl ester (44.6 millimols) were dissolved in 400 ml. of 1 N glacial acetic acid-HCl, and the solution was stirred for 1½ hours at room temperature. The glacial acetic acid was distilled off in vacuo at 40° C., and the oily residue was admixed with absolute ether. While standing overnight, a crystalline paste formed; the crystals were vacuum filtered off, washed and dried. Yield: 15.95 gm. (98.7% of theory), M.P. 199–200° C.

(7) BOC-L-prolyl-L-phenylalanyl - L - phenylalanine-methyl ester (D/4–6).—16.8 gm. (46.3 millimols) of L-phenylalanyl-L-phenylalanine methyl ester hydrochloride were dissolved in 50 ml. of dimethylformamide, and the solution was admixed with a solution of 4.7 gm. of triethylamine (46.6 millimols) in 100 ml. of absolute tetrahydrofuran, whereby triethylamine hydrochloride separated out. The resulting suspension was added, while stirring vigorously, to a solution of 14.4 gm. of tert. butoxycarbonyl-L-proline-hydroxysuccinimideester in 100 ml. of absolute tetrahydrofuran, and stirring was continued overnight at room temperature. The separated triethylamine hydrochloride was vacuum filtered off, and the filtrate was evaporated in vacuo at a bath temperature of 40° C. The residue was dissolved in 150 ml. of ethylacetate, extracted five times with 20 ml. of 1 N hydrochloric acid, twice with 50 ml. of water, five times with 20 ml. of a 2 N soda solution and three times with 50 ml. of water, dried over MgSO₄ and evaporated in vacuo at 40° C. bath temperature. Yield: 21.8 gm. of colorless crystals (90.0% of theory), M.P. 113–115° C.

(8) L-prolyl-L-phenylalanyl - L - phenylalanine methyl ester hydrochloride (E/4–6).—19.0 gm. of tert. butoxycarbonyl-L-prolyl-L-phenylalanyl-L-phenylalanine methyl ester (36.4 millimols) were dissolved in 360 ml. of 1 N glacial acetic acid-HCl, and the solution was stirred for 1½ hours at room temperature. The glacial acetic acid was distilled off in vacuo at 40° C. bath temperature. The oily residue was digested with absolute ether until it disintegrated into powder form. The precipitate was vacuum filtered off and was reprecipitated from approximately 50 ml. of methanol with 150 ml. of ether. Yield: 15.5 gm. (92.5% of theory), M.P. 108–112° C. (decomposition).

(9) BOC-L-Phenylalanyl-L-proline methyl ester B/2–3).—26.5 gm. (0.1 mole) of tert. butoxycarbonyl-L-phenylalanine were dissolved in 120 ml. of absolute tetrahydrofuran, the solution was cooled to −15° C., admixed with 10.1 gm. of triethylamine (0.1 mol), and subsequently 5.42 gm. (0.05 mol) of ethyl chloroformate were added dropwise. Thereafter, the reaction mixture was stirred 10 to 15 minutes at −15° C., whereby triethylamine hydrochloride separated out. 6.45 gm. of L-proline methyl ester (0.05 mol) were dissolved in absolute tetrahydrofuran, this solution was added at −15° C. to the above reaction mixture, and the mixture was stirred overnight at room temperature. The triethylamine hydrochloride which had separated out was vacuum filtered off, and the filtrate was evaporated at 40° C. bath temperature in vacuo. The evaporation residue was dissolved in 100 ml. of ethylacetate, and the solution was washed four times with 40 ml. of a saturated $NaHCO_3$ solution and once with 30 ml. of water. After drying of the ethyl acetate solution over $MgSO_4$ the ethylacetate was evaporated in vacuo. Yield: 17.0 gm. (90.35% of theory) of light yellow oil.

(10) BOC-L-Phenylalanyl-L-proline (C/2–3).—A solution of 18.90 gm. (50.25 millimols) of tert, butoxycarbonyl-L-phenylalanyl-L-proline methyl ester in 100 ml. of dioxane was admixed with 50.3 ml. of 1 N sodium hydroxide, and the mixture was stirred at room temperature for 30 minutes. The clear colorless solution was diluted with approximately 200 ml. of ethylacetate, and the aqueousalkaline phase was separated and extracted five times with 30 ml. portions of ethylacetate. The aqueous-alkaline phase was cooled to 0° C., admixed with 100 ml. of ethylacetate and, while stirring vigorously, adjusted to pH 1–2 with 4.4 ml. of concentrated hydrochloric acid (50.25 millimols). The ethyl acetate phase was separated, and the aqueous acidic phase was extracted six times with 30 ml. of ethyl acetate. After drying of the combined acid ethyl acetate extracts over $MgSO_4$ the solvent was evaporated in vacuo at 40° C. bath temperature. Yield: 12.05 gm. (66.2% of theory).

(11) BOC-L-Phenylalanyl-L-prolyl-L-prolyl-L-phenylalanyl-L-phenylalanine methyl ester (F/2–6). 18.1 gm. (50.0 millimols) of tert. butoxycarbonyl-L-phenylalanyl-L-proline were dissolved in 50 ml. of absolute tetrahydrofuran, the solution was cooled to −15° C., admixed with 5.05 gm. (50 millimols) of N-methylmorpholine and subsequently 2.7 gm. (25 millimols) of ethyl chloroformate were added dropwise. The reaction mixture was stirred 10–15 minutes at −15° C., whereby N-methylmorpholine hydrochloride separated out. 11.5 gm. (25 millimols) of L-prolyl-L-phenylalanyl-L-phenylalanine methyl ester hydrochloride were dissolved in 20 ml. of dimethylformamide, the solution was admixed with a solution of 2.52 gm. of N-methylmorpohline in 50 ml. of tetrahydrofuran, and the mixed solution was added to the above reaction mixture at −15° C. After addition of L-prolyl-L-phenylalanyl-L-phenylalanine methyl ester the mixture was stirred overnight at room temperature. The N-methylmorpholine hydrochloride which separated out was vacuum filtered off, and the filtrate was evaporated in vacuo at 40° C. bath temperature. The evaporation residue was dissolved in 150 ml. of ethyl acetate and the solution was extracted five times with 30 ml. of 1 N hydrochloric acid, twice with 50 ml. of water, five times with 30 ml. of a 2 N soda solution and twice with water, and dried over $MgSO_4$. The ethyl acetate was evaporated in vacuo, and the residue was reprecipitated from 100 ml. of ether with 200 ml. of petroleumether. After vacuum filtration, washing and drying of the precipitate 14.6 gm. (76% of theory) of the compound named in the heading were obtained. M.P. 74–76° C.

(12) L-Phenylalanyl-L-prolyl-L-prolyl-L-phenylalanyl-L-phenylalanine methyl ester hydrochloride (G/2–6).—13.4 gm. (20 millimols) of tert. butoxycarbonyl-L-phenylalanyl - L-prolyl-L-prolyl-L-phenylalanyl-L-phenylalanine methyl ester were dissolved in 20 ml. of 1 N glacial acetic acid-HCl, and the solution was stirred for 1½ hours at room temperature. The glacial acetic acid was distilled off in vacuo at 40° C. bath temperature, the residue was digested with absolute ether until it disintegrated into powder form, vacuum filtered off, washed with ether and dried. The compound was strongly hygroscopic. Yield: 12.05 gm. (83.7% of theory).

(13) BOC-L-Phenylalanyl-L-phenylalanyl-L-prolyl-L-prolyl-L-phenylalanyl-L-phenylalanine methyl ester (H/1–6).—A solution of 10.55 gm. (15 millimols) of L-phenylalanyl - L-prolyl-L-prolyl-L-phenylalanyl-L-phenylalanine methyl ester hydrochloride in 20 ml. of dimethylformamide was admixed with a solution of 1.52 gm. of triethylamine in 20 ml. of tetrahydrofuran, whereby triethylamide was admixed with a solution of 1.52 gm. of trivigorously, the resulting suspension was added to a solution of 5.43 gm. (15 millimols) of tert. butoxycarbonyl-L-phenylalanine-hydroxysuccinimide ester, and the mixture was stirred at room temperature for 16–18 hours. The triethylamine hydrochloride was vacuum filtered off, and the filtrate was evaporated to dryness in vacuo. The residue was dissolved in 120 ml. of ethylacetate, and the solution was extracted 8 times with 10 ml. portions of 1 N hydrochloric acid, once with 10 ml. of water, 8 times with 10 ml. portions of a 1 N $Na_2CO_3$ solution and twice with 10 ml. portions of water. After drying over $MgSO_4$, the ethylacetate was distilled off in vacuo at 40° C. bath temperature. Yield: 13.50 gm. (98.5% of theory).

(14) BOC-L-phenylalanyl-L-phenylalanyl-L-prolyl - L-prolyl-L-phenylalanyl-L-phenylalanine (J/1–6).—28 ml. of 1 N sodium hydroxide were added to a solution of 25.6 gm. (28 millimols) of tert. butoxycarbonyl-L-phenylalanyl-L-phenylalanyl-L-prolyl-L-prolyl-L - phenylalanyl-L-phenylalanine-methyl ester in 50 ml. of dioxane. The clear solution was stirred at room temperature for 30–40 minutes and subsequently admixed with approximately 100 ml. of ethylacetate. The aqueous alkaline phase was extracted five times with 30 ml. portions of ethyl acetate, then cooled to 0° C., admixed with 100 ml. of ethyl acetate and adjusted to pH 1–2 with 3.8 ml. of concentrated hydrochloric acid (28 millimols+10%). The ethylacetate was separated, and the aqueous acidic phase was extracted 8 times with 20 ml. portions of ethyl acetate. The combined acidic ethyl acetate extracts were dried over $MgSO_4$ and evaporated in vacuo. Yield: 16.8 gm. (66.6% of theory), M.P. 92° C. (sintering from 78° C.).

(15) BOC-L-phenylalanyl-L-phenylalanyl-L-prolyl - L-prolyl-L-phenylalanyl-L-phenylalanyl-L-valyl-L-prolyl - L-prolyl-glycine methyl ester (K/1–10).—16.2 gm. of tert. butoxycarbonyl-L-phenylalanyl-L-phenylalanyl-L - prolyl-L-prolyl-L-phenylalanyl-L-phenylalanine (18 millimols) were dissolved in 30 ml. of absolute tetrahydrofuran, the solution was cooled to −15° C., admixed with 1.82 gm. (18 millimols) of N-methylmorpholine, and subsequently 1.085 gm. (10 millimols) of ethyl chloroformate were added. The reaction mixture was stirred for 10–15 minutes more at −15° C., whereby N-methylmorpholine hydrochloride separated out. 4.185 gm. of L-valyl-L-prolyl-L-prolyl-glycine methyl ester hydrochloride (10 millimols) were dissolved in 15 ml. of dimethylformamide, the solution was admixed with a solution of 1.01 gm. (10 millimols) of N-methylmorpholine in 20 ml. of absolute tetrahydrofuran, and the mixed solution was added at −15° C. to above reaction mixture. After addition of the L-valyl-L-prolyl-L-prolyl-glycine methyl ester the mixture was stirred overnight at room temperature. The N-methylmorpholine-hydrochloride which separated out was vacuum filtered off, and the filtrate was evaporated in vacuo at a bath temperature of 40° C. The residue was dissolved in 100 ml. of ethyl acetate, the solution was extracted five times with 10 ml. portions of 1 N hydrochloric acid, once with 10 ml. of water, five times with 10 ml. portions of a 1 N Na₂CO₃ solution and twice with 10 ml. portions of water, and dried over MgSO₄. The ethyl acetate was distilled off in vacuo at 40° C. bath temperature. Yield: 11.6 gm. (91.65% of theory).

(16) BOC-L-phenylalanyl-L-phenylalanyl-L-prolyl - L-prolyl-L-phenylalanyl-L-phenylalanyl-L-valyl-L-prolyl - L-prolyl-glycine (L/1–10).—11.6 gm. (9 millimols) of the BOC-decapeptidemethyl ester obtained in Example 15 were dissolved in 130 ml. of dimethylformamide, and the solution was allowed to stand with its ten-fold equivalent amount of 1 N aqueous sodium hydroxide for 1 hour at room temperature. Thereafter, the dimethylformamide was evaporated in vacuo with much water, and the BOC-decapeptide acid was liberated by acidification with aqueous 5% citric acid and taken up in ethyl acetate. After drying of the solution over MgSO₄, 10.68 gm. (94% of theory) of a colorless, amorphous, thin-layer chromatographically uniform powder were isolated.

(17) L-phenylalanyl-L-phenylalanyl-L-prolyl - L - prolyl-L-phenylalanyl-L-phenylalanyl-L-valyl - L - prolyl-L-prolyl-glycine (M/1–10).—10.68 gm. of BOC-L-phenylalanyl-L-phenylalanyl-L-prolyl-L-prolyl-L - phenylalanyl-L-phenylalanyl-L-valyl-L-prolyl-L-prolyl-glycine were covered with 65 ml. of trifluoroacetic acid and shaken until it dissolved completely (development of gas). After two hours of standing, the trifluoroacetic acid was evaporated in vacuo as far as possible. The remaining white trifluoroacetate was dissolved in several ml. of methanol-water (10:1) in order to remove the trifluoro acetic acid, the solution was admixed with 1.6 gm. of ammoniumbicarbonate and chromatographed on a Sephadex LH–20 column, with a 0.2% solution of ammonium bicarbonate in methanol-water (10:1) as the solvent ssytem. 8.16 gm. (83% of theory) of the amorphous, thin-layer chromatographically uniform decapeptide were obtained.

EXAMPLE 4

D-Ala-Antamanide: (One-step cyclization)

116 mgm. of L-phenylalanyl-L-prolyl-L-prolyl-L-phenylalanyl-L-phenylalanyl-L-valyl-L-prolyl - L - prolyl-D-alanyl-L-phenylalanine were dissolved with 115 mgm. of pyridine hydrochloride in 20 ml. of absolute dimethylformamide. After addition of 80 ml. of absolute tetrahydrofuran the solution was cooled on a salt-ice bath to −15° C. While stirring, 5 ml. of a solution of 0.95 ml. of ethyl chlorocarbonate in 99.05 ml. of absolute tetrahydrofuran was added to the cold solution, and the mixture was allowed to stand for 20 minutes at −15° C. Then 0.17 ml. of N-methylmorpholine were added, and the mixture was stirred for 6 hours more at room temperature. After evaporation of the solvent in vacuo, the residue was dissolved in a little methanol, and the solution was applied to two preparative thin-layer plates of silicagel PF (0.3 mm.) as a starting line. After development with secondary butanol-ethyl acetate-water (14:12:5), the zones of the cyclopeptide were eluated at R_F∼0.65 with methanol. After evaporation of the solvent, the residue was taken up in several ml. of methanol/water (10:1) and chromatographed on a column (40 x 1800 mm.) of Sephadex LH–20 with the same solvent mixture. The compound appearing after approximately 1 liter in the eluate was D-Ala-antamanide. It crystallized when triturated with butanone. Yield: 28.3 mgm. (25.4% of theory), M.P. 171–172° C. (sintering from 168° C.). The empirical formula C₆₄H₇₈N₁₀O₁₀ was confirmed in the mass spectrum by the mass peak m/e 1146.

The decapeptide used as starting material in this example was produced as described in Example 2.

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective dosage unit of the compounds according to the present invention is from 0.0083 to 1.66 mgm./kg. body weight, preferably 0.0166 to 0.34 mgm./kg. body weight.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:
1. The crystalline cyclic decapeptide of the formula

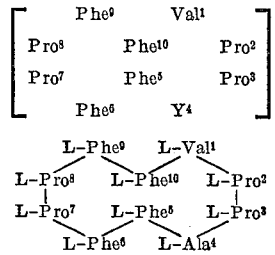

having a melting point of 171.5–172° C.

References Cited

UNITED STATES PATENTS 2,912,427  11/1959  Schwyza et al. _____ 260—112.5
3,211,716  10/1965  Schwyzer _____ 260—112.5

OTHER REFERENCES

Anderson et al., J. Am. Chem. Soc. 88, 1338–1339 (1966).

Anderson et al., J. Am. Chem. Soc. 89, 5012–5017 (1967).

Boissonnas et al., Helv. Chim Acta 35, 2229–2235 (1952).

Wieland, Angew. Chem. 80, 209–213 (1968).

Wieland et al., Peptides 1968, Proc. 8th Europ. Peptide Symposium, North-Holland Publishing Co., Amsterdam (1968).

Wieland et al., Ann. 671, 160–164 (1964).

ELBERT L. ROBERTS, Primary Examiner

U.S. Cl. X.R.

424—177

UNITED STATES PATENT OFFICE
CERTIFICATE OF CORRECTION

Patent No. 3,705,887      Dated December 12, 1972

Inventor(s) Theodor Wieland et al.

It is certified that error appears in the above-identified patent and that said Letters Patent are hereby corrected as shown below:

Column 1, after line 8, insert -- Claims priority, application Germany, Oct. 17, 1967, P 16 43 251.2 and Aug. 12, 1968 P 17 93 180.5 --. Column 10, line 26, "(7.8 millimols)" should read -- (74.8 millimols) --. Column 12, line 20, delete "amide was admixed with a solution of 1.52 gm of tri-" and insert -- amine hydrochloride precipitated out. While stirring --. Column 4, claim 1, delete

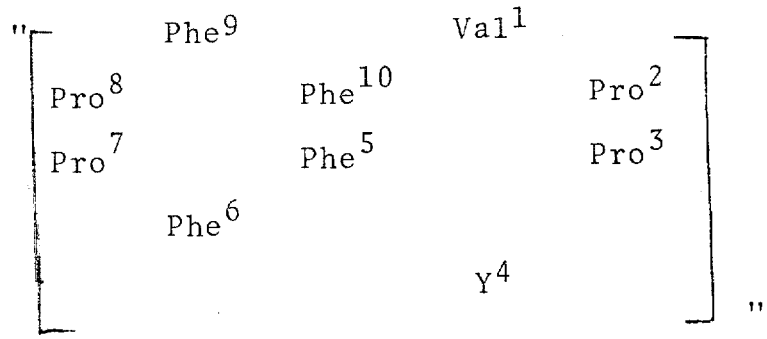

Signed and sealed this 10th day of July 1973.

(SEAL)
Attest:

EDWARD M. FLETCHER, JR.
Attesting Officer

Rene Tegtmeyer
Acting Commissioner of Patents